US008538274B2

(12) United States Patent
Li et al.

(10) Patent No.: US 8,538,274 B2

(45) Date of Patent: Sep. 17, 2013

(54) OPTICAL RELAY SYSTEM AND METHOD

(75) Inventors: Lijun Li, Shenzhen (CN); Qianjin Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 540 days.

(21) Appl. No.: 12/815,137

(22) Filed: Jun. 14, 2010

(65) Prior Publication Data

US 2010/0247111 A1 Sep. 30, 2010

Related U.S. Application Data

(63) Continuation of application No. PCT/CN2008/073229, filed on Nov. 27, 2008.

(30) Foreign Application Priority Data

Dec. 14, 2007 (CN) .......................... 2007 1 0195745

(51) Int. Cl.
*H04B 10/02* (2011.01)

(52) U.S. Cl.
USPC ............................ 398/175; 398/126; 398/177

(58) Field of Classification Search
USPC ............................ 398/97, 126, 160, 174–181
See application file for complete search history.

(56) References Cited

U.S. PATENT DOCUMENTS 5,857,040 A 1/1999 Bigo et al.
6,795,653 B1 9/2004 King
2001/0022678 A1 9/2001 Leclerc et al.
2003/0202727 A1* 10/2003 Olesen .............................. 385/1
2005/0158060 A1 7/2005 Cuenot et al.
2006/0072921 A1* 4/2006 Fuse ............................ 398/140
2006/0204248 A1 9/2006 Grigoryan et al.

FOREIGN PATENT DOCUMENTS

CN 1658021 A 8/2005
CN 1715993 A 1/2006
EP 1 544 669 A1 6/2005
WO WO 2007/016922 A1 2/2007

OTHER PUBLICATIONS

Supplementary European Search Report dated May 27, 2011 in connection with European Patent Application No. 08 86 2116.

International Search Report dated Mar. 5, 2009 in connection with International Patent Application No. PCT/CN2008/073229.

Written Opinion of the International Searching Authority dated Mar. 5, 2009 in connection with International Patent Application No. PCT/CN2008/073229.

(Continued)

*Primary Examiner* — Dzung Tran

(57) ABSTRACT

An optical relay system is provided, which includes a first optical signal distribution device (101), a phase detection device (103), an amplitude regeneration device (102), and a phase regeneration and load device (104). An optical relay method is further provided, which includes the following steps. A received input signal is divided into two paths; phase information of one path of the input signal is extracted, and is converted to an amplitude modulated signal; an amplitude of the other path of the input signal is restored, so as to generate an amplitude regenerated signal; a phase is loaded on the amplitude regenerated signal by using the amplitude modulated signal, so as to generate a phase regenerated signal. The system and method eliminate a phase noise of the signal in a transmission process, improve a transmission performance of the signal, and realize a simple implementation method.

10 Claims, 16 Drawing Sheets

Input signal

First optical signal distribution device

Phase detection device

Phase detection module

Filter module

Amplitude regeneration device

Phase regeneration and load device

Phase regenerated signal

(56) References Cited

OTHER PUBLICATIONS

Partial Translation of Office Action dated Mar. 3, 2011 in connection with Chinese Patent Application No. 200710195745.8.

Summons to attend oral proceedings pursuant to Rule 115(1) EPC dated Mar. 14, 2013 in connection with European Patent Application No. 08 862 116.4.

* cited by examiner

OPTICAL RELAY SYSTEM AND METHOD

CROSS-REFERENCE TO RELATED APPLICATIONS

This application is a continuation of International Application No. PCT/CN2008/073229, filed on Nov. 27 2008, which claims priority to Chinese Patent Application No. 200710195745.8 filed on Dec. 14, 2007, both of which are hereby incorporated by reference in their entireties.

TECHNICAL FIELD

The present invention relates to the field of optical communications, and more particularly to an optical relay system and an optical relay method.

BACKGROUND

As compared with a pure intensity modulated signal, a phase modulated optical signal has a higher spectral efficiency and a stronger anti-channel impairment capability. However, usually, an optical relay technology is applied for the intensity modulated signal, and if the existing optical relay technology is applied to the amplitude modulated signal, phase information of the signal will be lost, which limits the performance of the optical signal from being improved.

When the optical signal is transmitted, phase noises resulting from a transmission line may deteriorate the performance of the signal. In order to restrain the phase noise, an optical relay technology, that is, an optical regeneration method, is provided in the prior art. In the technology, the optical signal is converted to an electrical signal on a receiving end, and then the electrical signal is processed. The optical regeneration method is briefly described as follows.

Firstly, spectrum estimation is performed on the phase noise, that is, the phase information of the phase modulated signal is converted to intensity information through differential interference and balancing receiving. In other words, the optical-to-electrical conversion is performed on the information borne on the former signal, the phase information is recovered to the intensity information, and then a phase modulator re-loads the phase on the optical carrier phase by using the intensity information, so as to regenerate the phase.

During the implementation of the present invention, the inventors find that the optical regeneration method in the prior art at least has the following problems.

The method relates to a plurality of spectrum estimation methods, so that the implementation is complicated. In addition, an electrical processing speed is slow, which is not suitable for the processing of high-speed signals.

SUMMARY

The present invention is directed to an optical relay system and an optical relay method, which are capable of effectively restraining a phase noise generated by an optical signal during a transmission process. The technical solutions are described in the following.

The present invention provides an optical relay system, which includes a first optical signal distribution device, a phase detection device, an amplitude regeneration device, and a phase regeneration and load device.

The first optical signal distribution device is adapted to receive an input signal, divide the input signal into a first path of the input signal and a second path of the input signal, and separately output the first path of the input signal and the second path of the input signal.

The phase detection device is adapted to receive the first path of the input signal output by the first optical signal distribution device, extract phase information of the first path of the input signal, convert the phase information to an amplitude modulated signal, and output the amplitude modulated signal.

The amplitude regeneration device is adapted to receive the second path of the input signal output by the first optical signal distribution device, shape the second path of the input signal to obtain an amplitude regenerated signal, and output the amplitude regenerated signal.

The phase regeneration and load device is adapted to receive the amplitude modulated signal output by the phase detection device and the amplitude regenerated signal output by the amplitude regeneration device, and load a phase on the amplitude regenerated signal by using the amplitude modulated signal to generate a phase regenerated signal.

The present invention further provides an optical relay method, which includes the following steps.

A received input signal is divided into two paths.

Phase information of one path of the input signal is extracted, and the phase information is converted to an amplitude modulated signal.

An amplitude of the other path of the input signal is restored, so as to generate an amplitude regenerated signal.

A phase is loaded on the amplitude regenerated signal by using the amplitude modulated signal, so as to generate a phase regenerated signal.

In the embodiments of the present invention, the amplitude modulated signal is generated according to the extracted phase information, the phase information is loaded on the phase base by using the amplitude modulated signal, so as to generate the phase regenerated signal, thus eliminating the phase noise of the signal in the transmission process, improving a transmission performance of the signal, and realizing a simple implementation method.

DETAILED DESCRIPTION

The implementation of the present invention is further described in detail with reference to the accompanying drawings.

In the embodiments of the present invention, phase information of an input signal is extracted, the phase information is converted to an amplitude,modulated signal, and the phase information is loaded on a phase base by a phase regeneration and load device by using the amplitude modulated signal, so as to generate the phase regenerated signal is generated, thus eliminating the phase noise of the signal in a transmission process.

Embodiment 1

Figure 1:
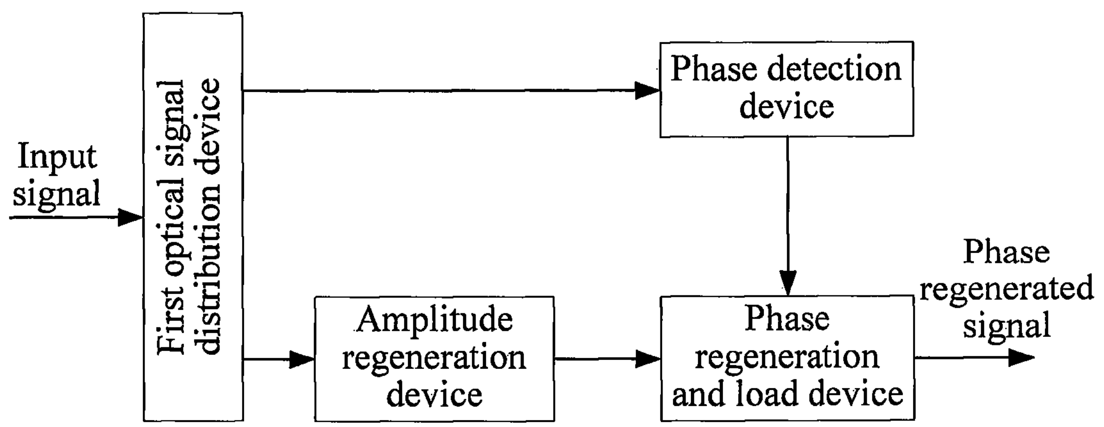
FIG. 1 is a schematic structural view of an optical relay system according to Embodiment 1 of the present invention.

Referring to FIG. 1, an optical relay system is provided in this embodiment, which includes a first optical signal distribution device, a phase detection device, an amplitude regeneration device, and a phase regeneration and load device.

The first optical signal distribution device is adapted to receive an input signal, divide the input signal into a first path of the input signal and a second path of the input signal, and separately output the first path of the input signal and the second path of the input signal.

The phase detection device is adapted to receive the first path of the input signal output by the first optical signal distribution device, extract phase information of the first path of the input signal, convert the phase information to an amplitude modulated signal, and output the amplitude modulated signal. The amplitude modulated signal is the phase information borne on an intensity signal, and is a high-low-level signal adapted to modulate a phase of the signal.

The amplitude regeneration device is adapted to receive the second path of the input signal output by the first optical signal distribution device, shape the input signal to obtain an amplitude regenerated signal, and output the amplitude regenerated signal. The amplitude regenerated signal is a new phase base, and a phase may be loaded on the base again.

The phase regeneration and load device is adapted to receive the amplitude modulated signal output by the phase detection device and the amplitude regenerated signal output by the amplitude regeneration device, and modulate the amplitude regenerated signal by using the amplitude modulated signal to generate a phase regenerated signal.

Figure 2:
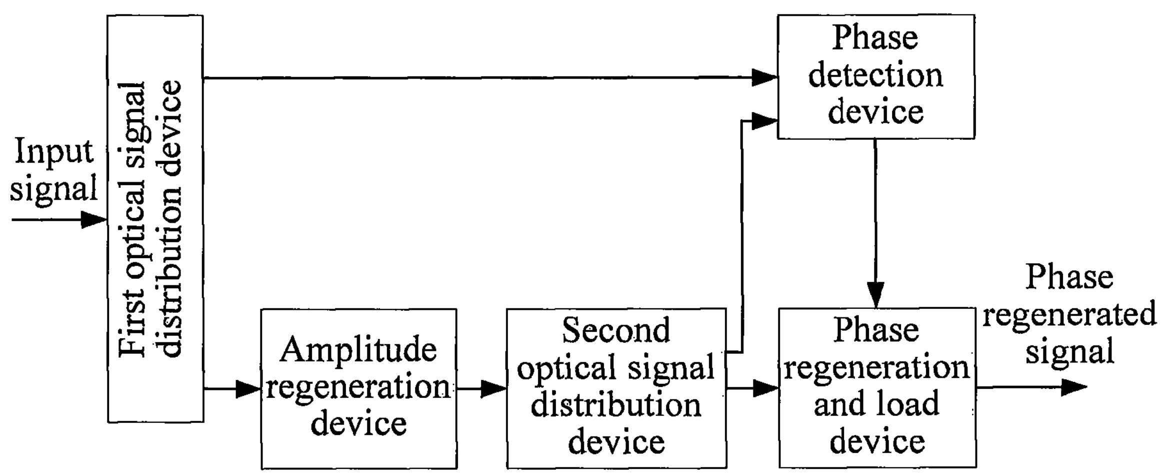
FIG. 2 is a schematic structural view of another optical relay system according to Embodiment 1 of the present invention.

Further, the phase detection device may extract the phase information of the signal under the assistance of the signal output by the amplitude regeneration device. Referring to FIG. 2, a second optical signal distribution device is placed between the amplitude regeneration device and the phase regeneration and load device, and the second optical signal distribution device is adapted to divide the amplitude regenerated signal output by the amplitude regeneration device into two paths, output a first path of the amplitude regenerated signal to the phase detection device, and output a second path of the amplitude regenerated signal to the phase regeneration and load device. Correspondingly, the phase detection device is further adapted to receive the first path of the amplitude regenerated signal output by the second optical signal distribution device, and extract the phase information of the first path of the input signal according to the first path of the amplitude regenerated signal.

Figure 3:
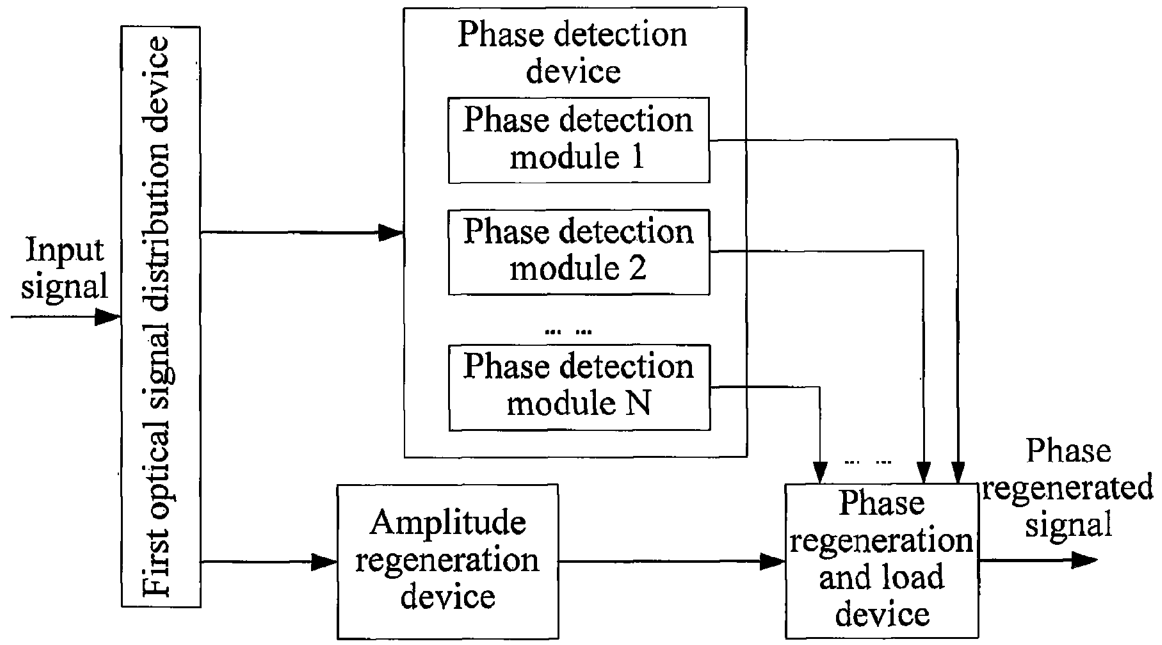
FIG. 3 is a detailed structural view of the optical relay system according to Embodiment 1 of the present invention.
Figure 4:
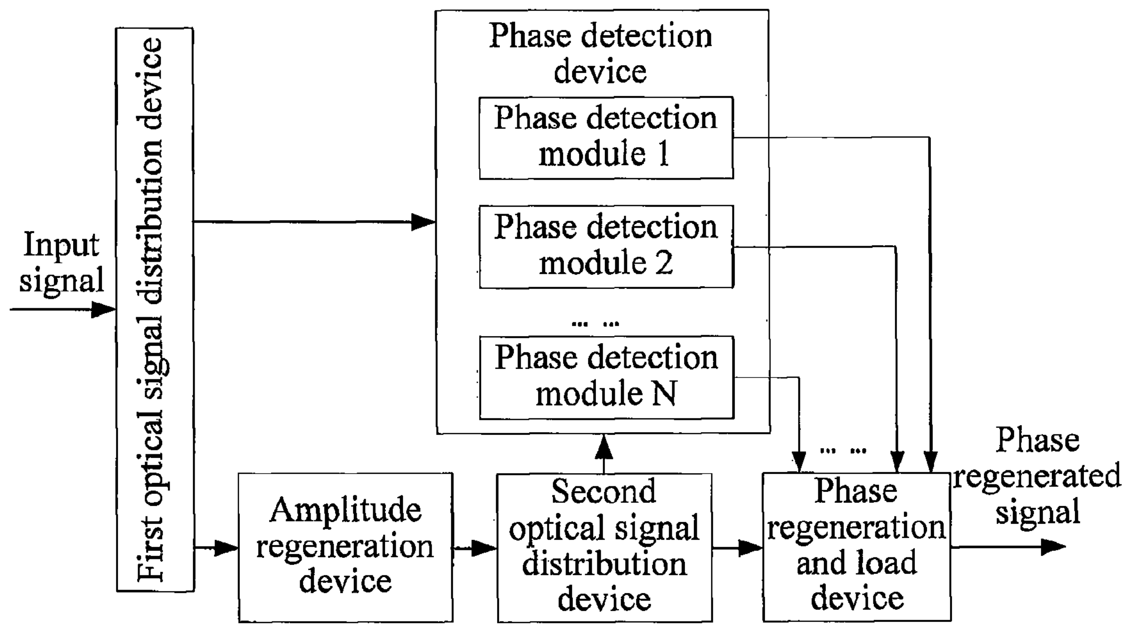
FIG. 4 is a detailed structural view of another optical relay system according to Embodiment 1 of the present invention.

When the signal is loaded by adopting a multi-level amplitude modulated signal MPSK ($M=2^N$), the phase detection device includes a plurality of phase detection modules, being a phase detection module 1, a phase detection module 2 . . . and a phase detection module N. Referring to FIG. 3 or 4, in the optical relay system, each phase detection module is adapted to extract preset phase information of the received first path of the input signal, convert the extracted phase information to the corresponding amplitude modulated signal, and output the corresponding amplitude modulated signal to the phase regeneration and load device. For example, the phase extracted by the phase detection module 1 from the first path of the input signal is n, and the phase extracted by the phase detection module 2 from the first path of the input signal is $\pi/2$. The phase detection device outputs N paths of the amplitude modulated signals to the phase regeneration and load device.

The optical relay system according to this embodiment may be flexibly placed according to demands, in which the amplitude modulated signal is generated through the phase information extracted by the phase detection device, the phase information is loaded on the new phase base by the phase regeneration and load device by using the amplitude modulated signal, so as to generate the phase regenerated signal, thus eliminating the phase noise of the signal in the transmission process, improving a transmission performance of the signal, and realizing a simple implementation method.

Embodiment 2

Figure 5:
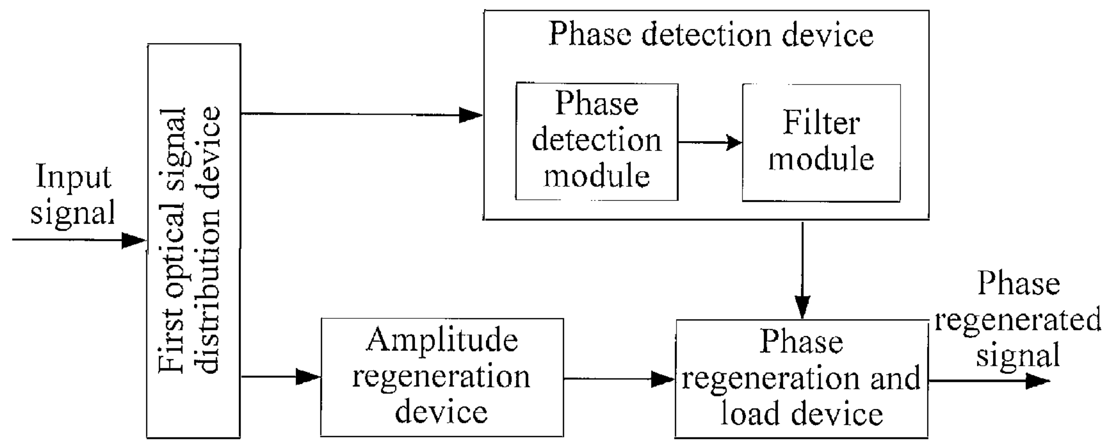
FIG. 5 is a detailed structural view of an optical relay system according to Embodiment 2 of the present invention.

An optical relay system is provided in this embodiment. Being similar to Embodiment 1, the optical relay system provided in this embodiment also includes a first optical signal distribution device, a phase detection device, an amplitude regeneration device, a second optical signal distribution device (optional), and a phase regeneration and load device. Functions of the devices are the same as those of Embodiment 1, so they are not repeated here. The relay system is adapted for an all-optical relay of an Optical Dual Binary (ODB) signal. Referring to FIG. 5, the phase detection device in this embodiment includes a phase detection module and a filter module.

The phase detection module is adapted to receive a first path of an input signal output by the first optical signal distribution device, extract phase information of the first path of the input signal, and convert the phase information to an amplitude modulated signal, in which the amplitude modulated signal is the phase information borne on an intensity signal, and is a high-low-level signal adapted to modulate a phase of the signal.

The filter module is adapted to receive the amplitude modulated signal output by the phase detection module, filter out a clutter signal in the amplitude modulated signal, and output the amplitude modulated signal without the clutter signal to the phase regeneration and load device.

Figure 6:
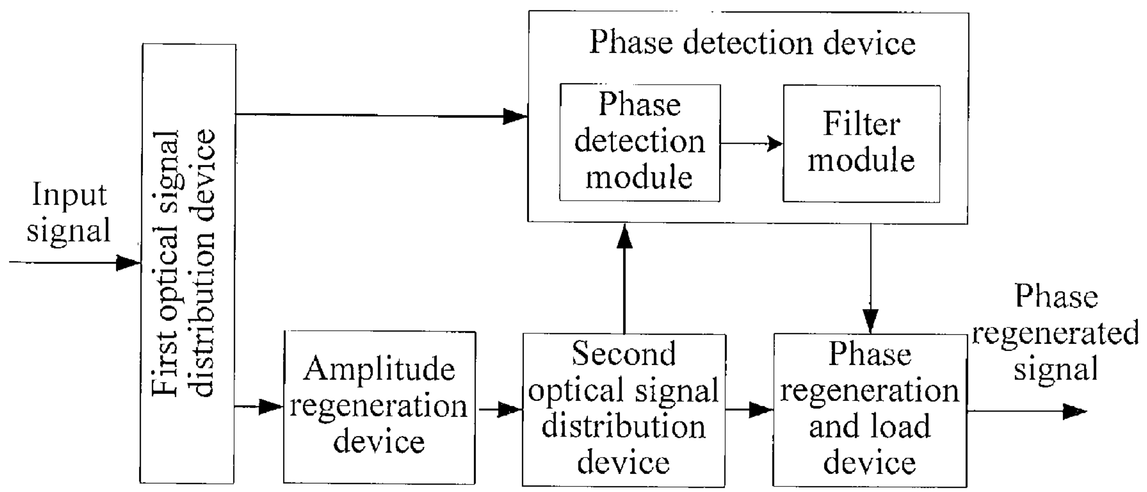
FIG. 6 is a detailed structural view of another optical relay system according to Embodiment 2 of the present invention.

Referring to FIG. 6, the second optical signal distribution device is placed between the amplitude regeneration device and the phase regeneration and load device, in which the amplitude modulated signal output by the phase detection device includes a spectral component generated by the amplitude regeneration device and a spectral component of the first path of the input signal, and the filter module is adapted to filter the spectral component of the first path of the input signal.

Figure 7:
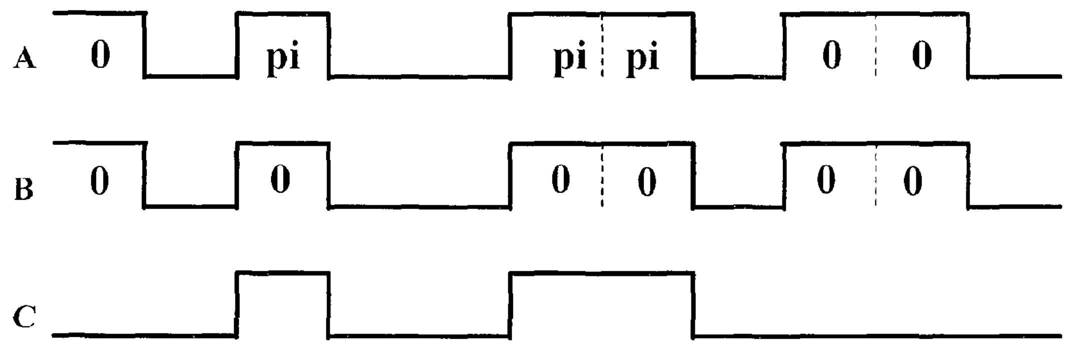
FIG. 7 is a schematic signal timing diagram of the optical relay system according to Embodiment 2 of the present invention.

When a signal sequence of the input signal input to the first optical signal distribution device is A, correspondingly, signal sequences of the amplitude regenerated signal B output by the amplitude regeneration device and the amplitude modulated signal C output by the filter module in FIG. 5 or FIG. 6 are as shown in FIG. 7, in which the signal sequence of the amplitude regenerated signal B is a recurrence of amplitude information of the input signal, a phase of the signal sequence is a non-modulated continuous phase, and the signal sequence of the amplitude modulated signal C is a recurrence of the phase information of the input signal.

Further, the phase detection device is adapted to convert the phase information of the signal to intensity information. In order to implement the conversion, the amplitude regeneration device needs to output the amplitude regenerated signal to perform some adaptations on the first path of the input signal. The adaptation includes three aspects, namely, amplitude adaptation, frequency adaptation, and phase adaptation. The corresponding phase detection module particularly includes a calibration unit and a coupling unit.

The calibration unit is adapted to receive the first path of the input signal output by the first optical signal distribution device and one path of the amplitude regenerated signal output by the second optical signal distribution device, calibrate an amplitude, a wavelength, and a phase of the first path of the input signal according to the path of the amplitude regenerated signal to generate a calibration signal having an amplitude, a frequency, and a phase that are the same as the path of the amplitude regenerated signal, and output the calibration signal and the path of the amplitude regenerated signal.

The coupling unit is adapted to receive the calibration signal and the path of the amplitude regenerated signal output by the calibration unit, interfere with the calibration signal and the path of the amplitude regenerated signal to generate the amplitude modulated signal, and output the amplitude modulated signal.

Correspondingly, the filter module is adapted to receive the amplitude modulated signal output by the coupling unit, filter out the clutter signal (the spectral component of the first path of the input signal) in the amplitude modulated signal, and output the filtered amplitude modulated signal.

After the first path of the input signal A and the amplitude regenerated signal B input to the phase detection device pass the amplitude calibration, the wavelength calibration, and the phase calibration, the regenerated signals have the same amplitude, the same frequency, and the same phase. The amplitude calibration enables the two paths signals of the first path of the input signal A and the amplitude regenerated signal B to have the same amplitude, and the function may be implemented by a combination of an optical amplifier and an optical attenuator. The wavelength calibration and the phase calibration enable the two paths signals have the same frequency by adjusting a local optical source of the amplitude regenerated signal B, and enable the phase of the amplitude regenerated signal B to be synchronous with the carrier phase of the first path of the input signal A.

The interference addition of the two paths signals having the same amplitude, the same frequency, and the same phase in the coupling unit is particularly implemented in the following.

For “0” code, an output end has no signal output.

For “1” code, when the phase of the input signal is 0, polarities of the two paths signals are opposite, energies are cancelled, and the output end has no signal output.

For “1” code, when the phase of the input signal phase is $\pi$, polarities of the two paths signals are the same, the energies are added, and the output end has the signal output. An output sequence is the signal sequence of the amplitude modulated signal C in FIG. 7.

Figure 8:
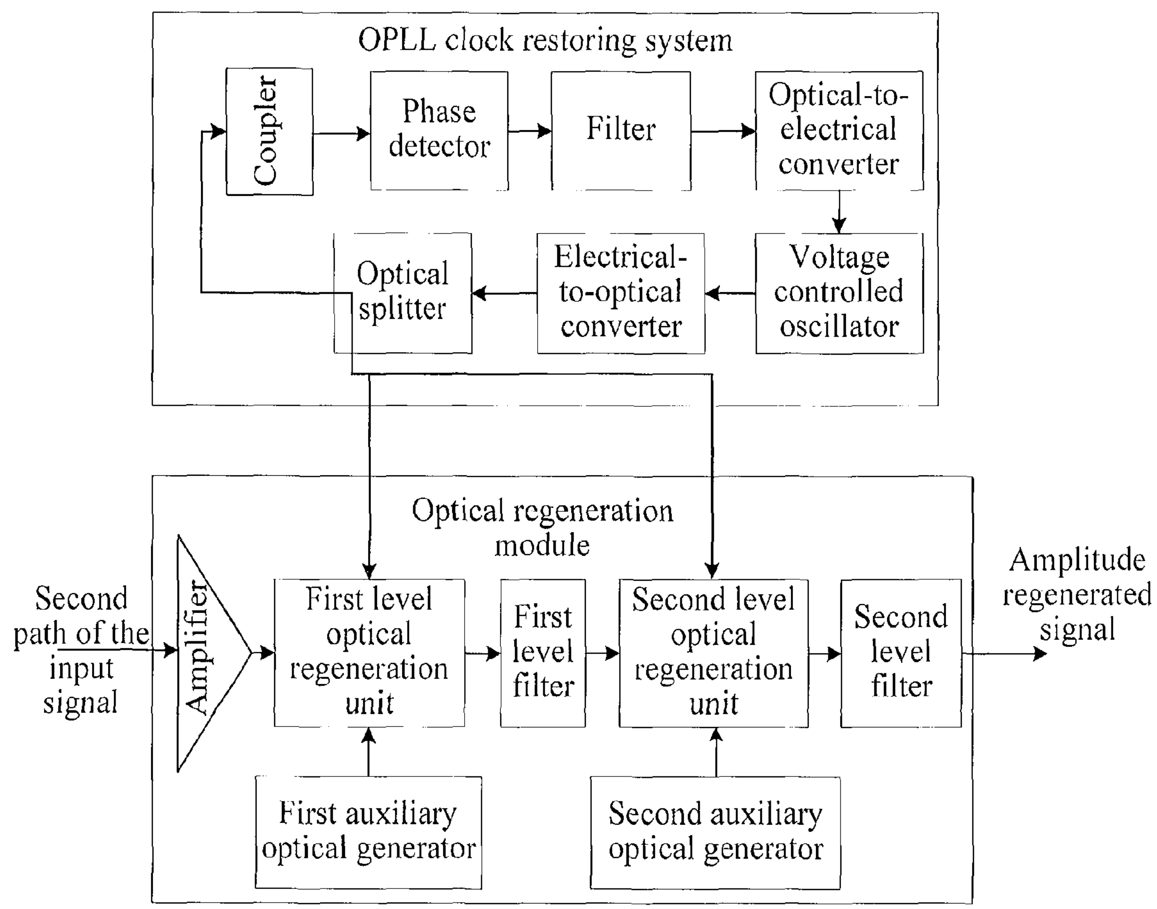
FIG. 8 is a detailed structural view of an amplitude regeneration device according to Embodiment 2 of the present invention.

Further, referring to FIG. 8, the amplitude regeneration device includes a clock restoring module and an optical regeneration module.

The clock restoring module is adapted to receive the second path of the input signal output by the first optical signal distribution device, extract a clock signal of the second path of the input signal, and output the clock signal.

The optical regeneration module is adapted to receive the second path of the input signal output by the first optical signal distribution device and the clock signal output by the clock restoring module, shape the second path of the input signal after being triggered by the clock signal to obtain the amplitude regenerated signal, and output the amplitude regenerated signal.

The optical regeneration module and the clock restoring module are combined, so as to form an amplitude regeneration device having an added re-timing function, so as to periodically amplify and shape the input signal. The clock restoring module in this embodiment adopts an optical phase lock-loop (OPLL) clock restoring system in the prior art, which particularly includes a coupler, a phase detector, a filter, an optical-to-electrical converter, a voltage controlled oscillator, an electrical-to-optical converter, and an optical splitter.

The coupler is adapted to receive the amplified second path of the input signal and a clock control signal generated by the OPLL clock restoring system, and couple the amplified second path of the input signal with the clock control signal.

The phase detector is adapted to extract a clock signal in the signal coupled by the coupler.

The filter is adapted to filter the clock signal extracted by the phase detector filter, so as to filter out the clutter signal.

The optical-to-electrical converter is adapted to convert the filtered clock signal to an electrical signal.

The voltage controlled oscillator is adapted to output the clock signal, in which a phase of the clock signal is controlled by a voltage in the electrical signal output by the optical-to-electrical converter.

The electrical-to-optical converter is adapted to convert the electrical signal after an oscillation is eliminated by the voltage controlled oscillator, and serve the optical signal as the clock control signal.

The optical splitter is adapted to divide the clock control signal converted by the electrical-to-optical converter to three paths (with a wavelength of $\lambda_c$), output a first path of the clock control signal to the coupler, and output a second path of the clock control signal and a third path of the clock control signal to two level optical regeneration units of the optical regeneration module.

Correspondingly, the optical regeneration module particularly includes an amplifier, a first auxiliary optical generator, a first level optical regeneration unit, a first level filter, a second auxiliary optical generator, a second level optical regeneration unit, and a second level filter.

The amplifier is adapted to receive the second path of the input signal (with a wavelength of $\lambda_S$) output by the first optical signal distribution device, amplify the second path of the input signal, divide the second path of the input signal into two paths, output one path to the coupler of the OPLL clock restoring system, and output the other path to the first level optical regeneration unit.

The first auxiliary optical generator is adapted to generate a first auxiliary optical signal (with a wavelength of $\lambda_{p1}$).

The first level optical regeneration unit is adapted to receive the amplified second path of the input signal output by the amplifier, the first auxiliary optical signal, and the second path of the clock control signal output by the optical splitter, shape the second path of the input signal by using the first auxiliary optical signal after being triggered by the second path of the clock control signal, obtain a first level amplitude regenerated signal (with a wavelength of $\lambda_{p1}$), that is, regenerate the amplitude of the second path of the input signal at a new wavelength position, so as to obtain the first level amplitude regenerated signal.

The first level filter is adapted to filter out a clutter signal in the first level amplitude regenerated signal obtained by the first level optical regeneration unit, and output the filtered first level amplitude regenerated signal (with a wavelength of $\lambda_S$).

The second auxiliary optical generator is adapted to generate a second auxiliary optical signal (with a wavelength of $\lambda_{p2}$), in this embodiment, the wavelength of the second auxiliary optical signal is consistent with the wavelength of the two paths of the input signal, that is, $\lambda_{p2}=\lambda_S$.

The second level optical regeneration unit is adapted to receive the first level amplitude regenerated signal filtered by the first level filter, the second auxiliary optical signal, and the third path of the clock control signal output by the optical splitter, shape the first level amplitude regenerated signal by using the second auxiliary optical signal after being triggered by the third path of the clock control signal, and obtain a second level amplitude regenerated signal (with a wavelength of $A_S$).

The second level filter is adapted to filter out a clutter signal in the second level amplitude regenerated signal obtained by the second level optical regeneration unit, and output the amplitude regenerated signal (with a wavelength of $A_S$).

Figure 9:
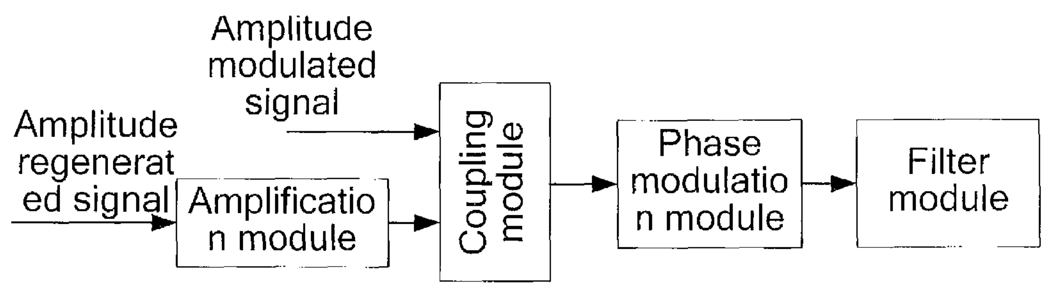
FIG. 9 is a detailed structural view of a phase regeneration and load device according to Embodiment 2 of the present invention.

Referring to FIG. 9, the phase regeneration and load device particularly includes an amplification module, a coupling module, a phase modulation module, and a filter module.

The amplification module is adapted to receive the amplitude modulated signal output by the phase detection device, amplify the amplitude modulated signal, and output the amplified amplitude modulated signal.

The coupling module is adapted to receive the amplitude modulated signal output by the amplification module and the amplitude regenerated signal output by the amplitude regeneration device, couple the amplified amplitude modulated signal with the amplitude regenerated signal, and output a coupled signal.

The phase modulation module is adapted to receive the coupled signal output by the coupling module, load the phase information on the coupled signal to generate the phase regenerated signal, and output the phase regenerated signal.

The filter module is adapted to receive the phase regenerated signal output by the phase modulation module, filter out a clutter signal in the phase regenerated signal, and obtain the phase regenerated signal without the clutter signal.

The phase modulation module utilizes a cross-phase modulate (that is, XPM) effect to modulate the phase on the amplitude regenerated signal by using the amplitude modulated signal, so as to re-load the complete phase information on the amplitude regenerated signal.

In this embodiment, the amplitude modulated signal is generated through the phase information extracted by the phase detection device, the phase information is loaded on the new phase base by the phase regeneration and load device by using the amplitude modulated signal, so as to generate the phase regenerated signal, thus eliminating the phase noise of the signal in the transmission process, improving a transmission performance of the signal, and realizing a simple implementation method.

Embodiment 3

Figure 10:
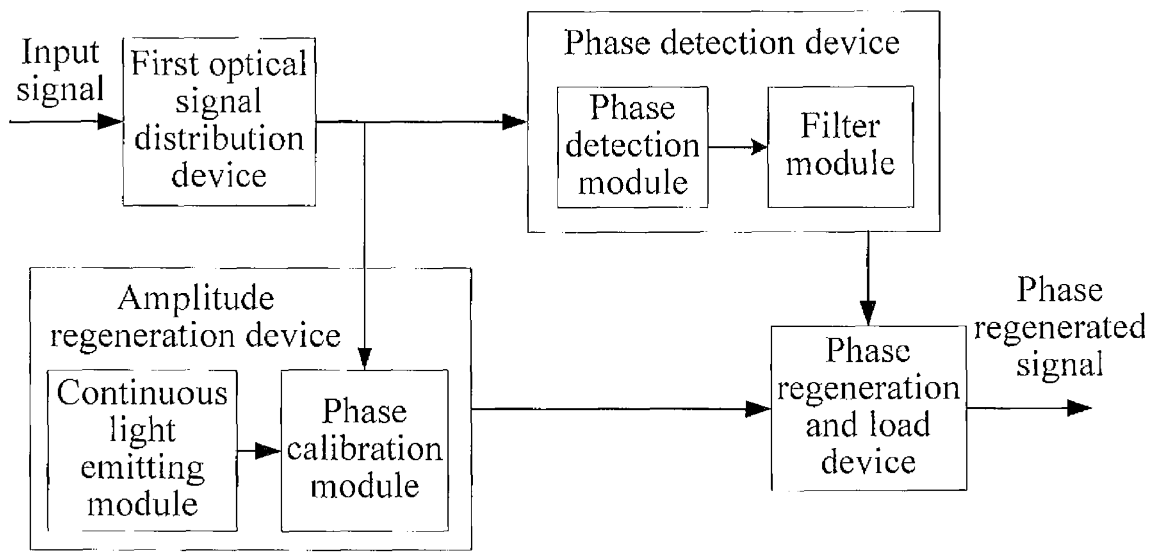
FIG. 10 is a detailed structural view of an optical relay system according to Embodiment 3 of the present invention.

An optical relay system is provided in this embodiment. Being similar to Embodiment 1, the optical relay system provided in this embodiment also includes a first optical signal distribution device, a phase detection device, an amplitude regeneration device, a second optical signal distribution device (optional), and a phase regeneration and load device. Functions of the devices are the same as that of Embodiment 1, so they are not described here. The relay system is adapted for an all-optical relay of a differential phase shift keying (DPSK) signal. Referring to FIG. 10, the amplitude regeneration device of the optical relay system provided in this embodiment includes a continuous light emitting module and a phase calibration module.

The continuous light emitting module is adapted to provide a continuous light.

The phase calibration module is adapted to receive a second path of an input signal output by the first optical signal distribution device and the continuous light provided by the continuous light emitting module, calibrate a phase of the continuous light according to the second path of the input signal to obtain an amplitude regenerated signal, and output the amplitude regenerated signal.

The continuous light emitting module is a simplified amplitude regeneration device when the signal is in the DPSK format. A phase of the amplitude regenerated signal is the same as a carrier of the second path of the input signal.

Being the same as that of Embodiment 2, the phase detection device in this embodiment particularly includes a phase detection module and a filter module, which are not described in detail here.

Figure 11:
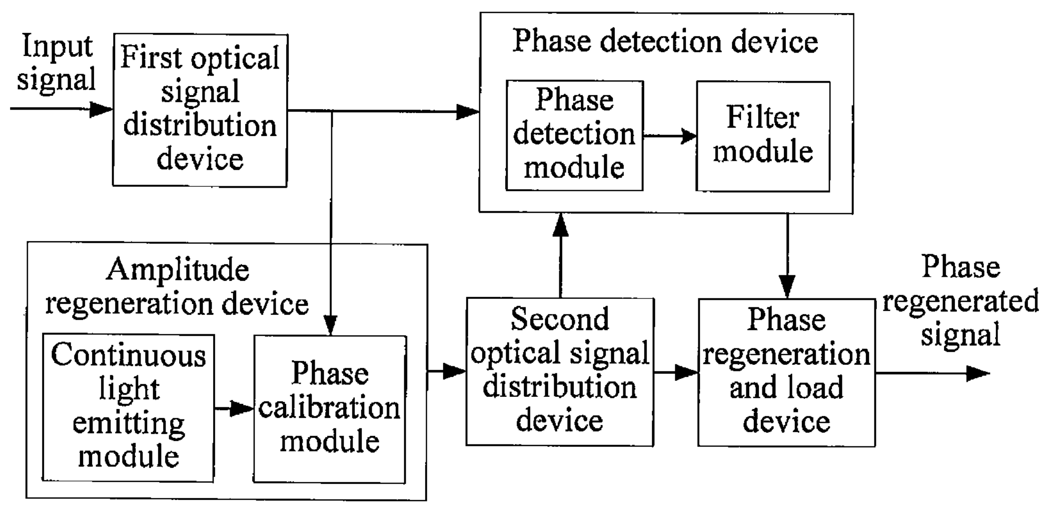
FIG. 11 is a detailed structural view of another optical relay system according to Embodiment 3 of the present invention.

Referring to FIG. 11, the second optical signal distribution device is placed between the amplitude regeneration device and the phase regeneration and load device, in which an amplitude modulated signal output by the phase detection device includes a spectral component generated by the amplitude regeneration device and a spectral component of the first path of the input signal, and the filter module is adapted to filter the spectral component of the first path of the input signal.

This embodiment is different from Embodiment 2 that as compared with the ODB signal, the DPSK signal is borne on the phase instead of the amplitude, such that here the amplitude regeneration device only needs to perform a phase calibration on the continuous light output by the continuous light emitting module. For the all-optical relay of the DPSK signal, the phase detection device needs a reference signal, and the reference signal may be obtained from the amplitude regenerated signal, as shown in FIG. 10, alternatively, the reference signal does not include data information, so the reference signal may also be generated in the phase detection device, as shown in FIG. 11.

Figure 12:
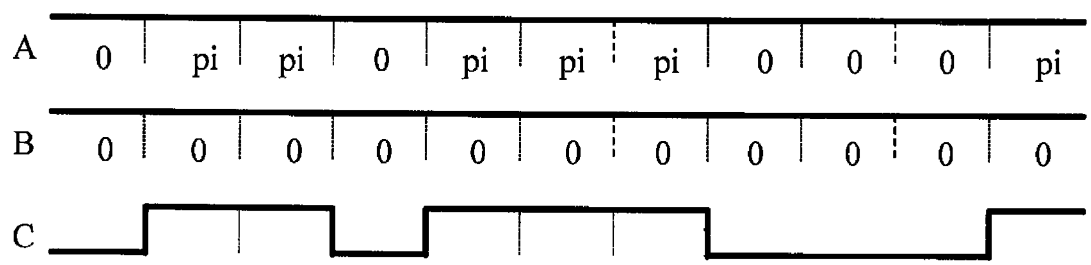
FIG. 12 is a schematic signal timing diagram of the optical relay system according to Embodiment 3 of the present invention.

When a signal sequence of the input signal input to the first optical signal distribution device is A, correspondingly, signal sequences of the amplitude regenerated signal B output by the amplitude regeneration device and the amplitude modulated signal C output by the filter module in FIG. 10 or 11 are as shown in FIG. 12, in which the signal sequence of the amplitude regenerated signal B is a recurrence of amplitude information of the input signal, a phase of the signal sequence is a non-modulated continuous phase, and the signal sequence of the amplitude modulated signal C is a recurrence of the phase information of the input signal.

In this embodiment, the amplitude modulated signal is generated through the phase information extracted by the phase detection device, the phase information is loaded on the new phase base by the phase regeneration and load device by using the amplitude modulated signal, so as to generate the phase regenerated signal, thus eliminating the phase noise of the signal in the transmission process, improving a transmission performance of the signal, and realizing a simple implementation method.

Embodiment 4

Figure 13:
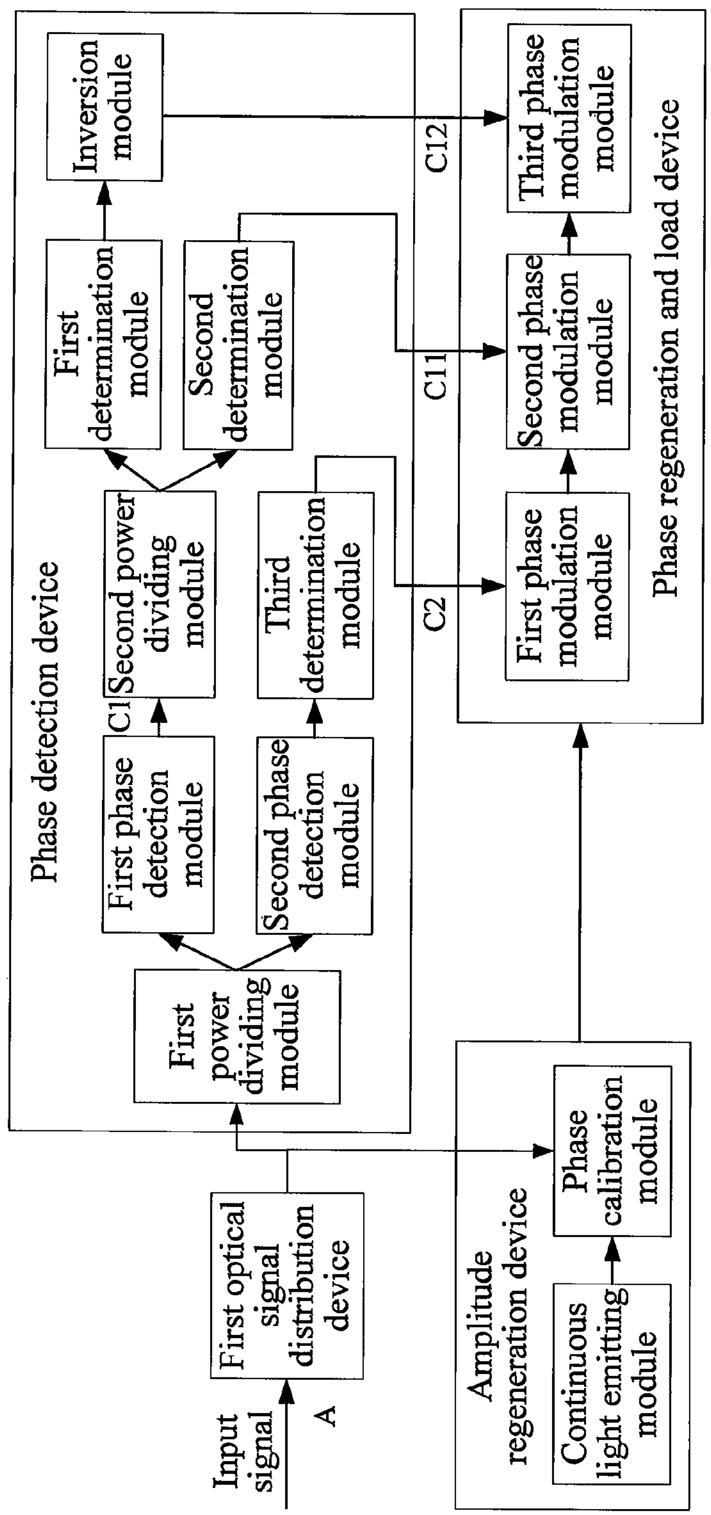
FIG. 13 is a detailed structural view of an optical relay system according to Embodiment 4 of the present invention.

An optical relay system is provided in this embodiment. Being similar to Embodiment 1, the optical relay system provided in this embodiment also includes a first optical signal distribution device, a phase detection device, an amplitude regeneration device, a second optical signal distribution device (optional), and a phase regeneration and load device. Functions of the devices are the same as those of Embodiment 1, so they are not repeated here. The optical relay system is adapted for an all-optical relay of a differential quadrature phase shift keying (DQPSK) signal. The system provided in this embodiment is designed in a serial mode, that is, the phase regeneration and load device implements the loading of the phase through three phase modulators. Meanwhile, the DQPSK signal has four phases, such that the phase detection device needs to provide three amplitude modulated signal, for modulating three phases. Referring to FIG. 13, the phase detection device particularly includes a first power dividing module, a first phase detection module, a second power dividing module, a first determination module, an inversion module, a second determination module, a second phase detection module, and a third determination module.

The first power dividing module is adapted to receive a first path of an input signal output by the first optical signal distribution device, divide the first path of the input signal into two paths, and output the two paths.

The first phase detection module is adapted to receive one path of signal of the first path of the input signal output by the first power dividing module, extract phase information of the path of the signal, convert the phase information to a first amplitude modulated signal, and output the first amplitude modulated signal.

The second power dividing module is adapted to receive the first amplitude modulated signal output by the first phase detection module, divide the first amplitude modulated signal into two paths, and output the two paths.

The first determination module is adapted to receive one path of the first amplitude modulated signal output by the second power dividing module, determine whether an amplitude of the path of the first amplitude modulated signal is a first preset amplitude, and if an amplitude of the path of the first amplitude modulated signal is a first preset amplitude, output the path of the first amplitude modulated signal.

The inversion module is adapted to invert the amplitude of the path of the first amplitude modulated signal output by the first determination module, and output the inverted first amplitude modulated signal to the phase regeneration and load device.

The second determination module is adapted to receive the other path of the first amplitude modulated signal output by the second power dividing module, determine whether an amplitude of the other path of the first amplitude modulated signal is a second preset amplitude, and if an amplitude of the other path of the first amplitude modulated signal is a second preset amplitude, output the other path of the first amplitude modulated signal to the phase regeneration and load device.

The second phase detection module is adapted to receive the other path of signal of the first path of the input signal output by the power dividing module, extract phase information of the other path of the signal, convert the phase information to a second amplitude modulated signal, and output the second amplitude modulated signal.

The third determination module is adapted to receive the second amplitude modulated signal output by the second phase detection module, determine whether an amplitude of the second amplitude modulated signal is a third preset amplitude, and if an amplitude of the second amplitude modulated signal is a third preset amplitude, output the second amplitude modulated signal to the phase regeneration and load device.

Correspondingly, the phase regeneration and load device is adapted to receive the inverted first amplitude modulated signal, the other path of the first amplitude modulated signal, and the second amplitude modulated signal output by the phase detection device, and the amplitude regenerated signal output by the amplitude regeneration device, load the phase on the amplitude regenerated signal by using the inverted first amplitude modulated signal, the other path of the amplitude modulated signal, and the second amplitude modulated signal, so as to generate the phase regenerated signal.

Further, the phase regeneration and load device includes a first phase modulation module, a second phase modulation module, and a third phase modulation module.

The first phase modulation module is adapted to receive the second amplitude modulated signal output by the third determination module and the amplitude regenerated signal output by the amplitude regeneration device, load the phase on the amplitude regenerated signal by using the second amplitude modulated signal to obtain a first phase regenerated signal, and output the first phase regenerated signal.

The second phase modulation module is adapted to receive the first phase regenerated signal output by the first phase modulation module and the other path of the first amplitude modulated signal output by the second determination module, load a phase on the first phase regenerated signal by using the other path of the first amplitude modulated signal to obtain a second phase regenerated signal, and output the second phase regenerated signal.

The third phase modulation module is adapted to receive the second phase regenerated signal output by the second phase modulation module and the inverted first amplitude modulated signal output by the inversion module, and load a phase on the second phase regenerated signal by using the inverted first amplitude modulated signal, so as to generate the phase regenerated signal.

The amplitude regeneration device in this embodiment particularly includes a continuous light emitting module and a phase calibration module, having functions that are the same as those in Embodiment 3, such that they are not described in detail here.

Figure 14:
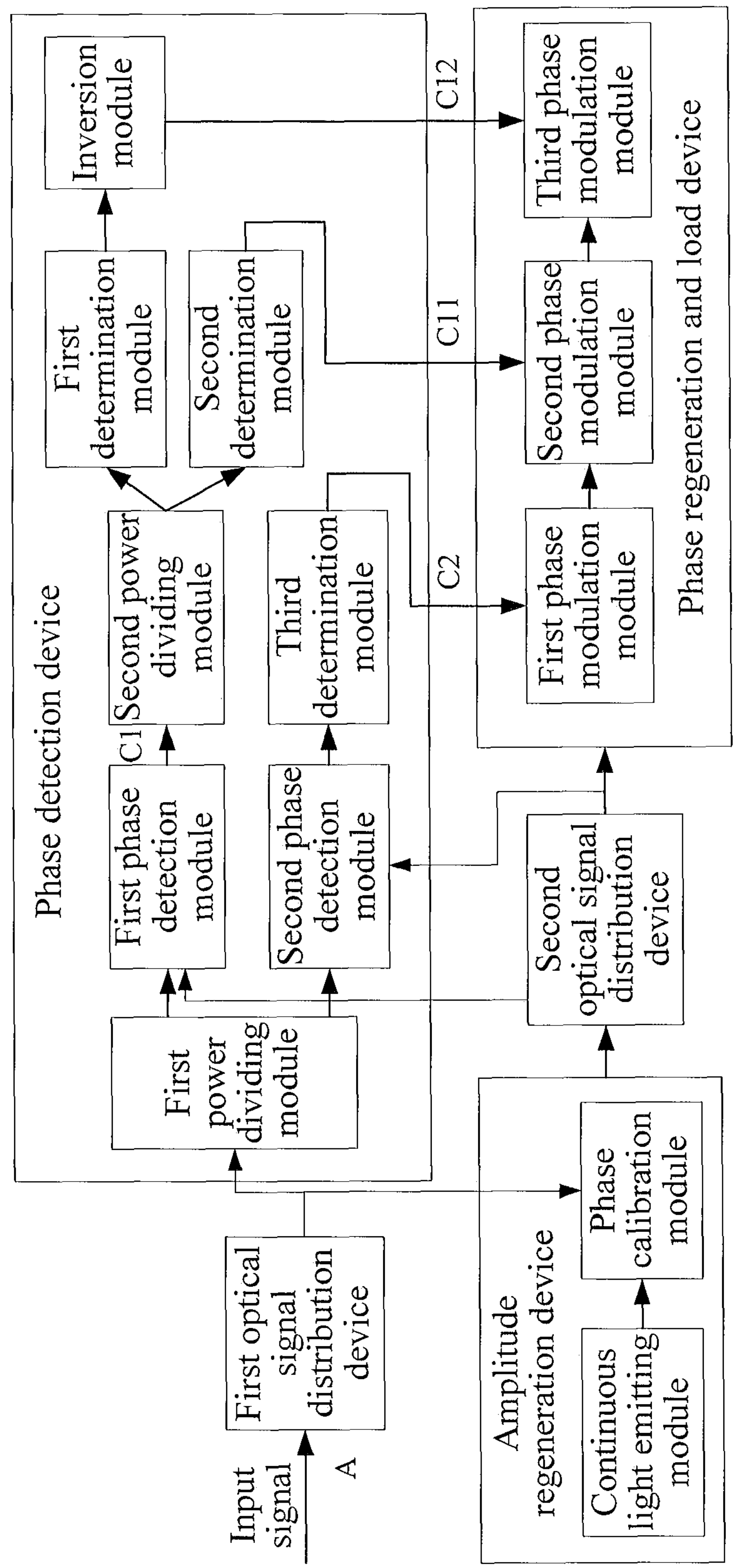
FIG. 14 is a detailed structural view of another optical relay system according to Embodiment 4 of the present invention.

Referring to FIG. 14, the second optical signal distribution device is placed between the amplitude regeneration device and the phase regeneration and load device, and the second optical signal distribution device is adapted to provide auxiliary signals for the first phase detection module and the second phase detection module, so as to extract the phase. Functions of the second optical signal distribution device are the same as those in Embodiment 1, and are not described in detail here.

Figure 15:
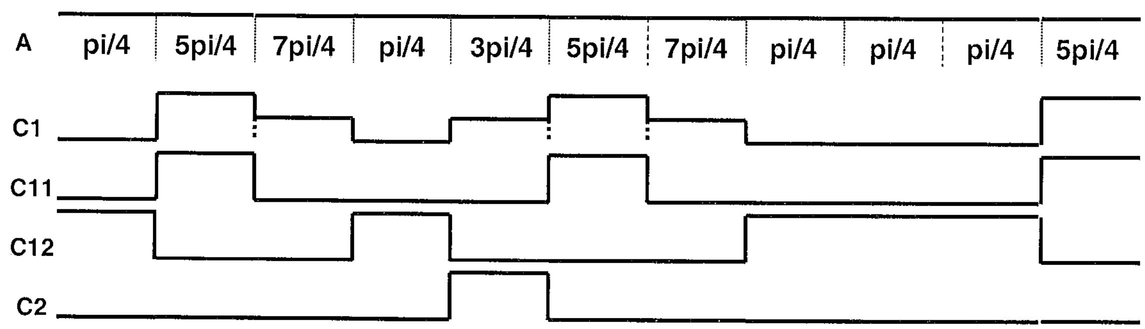
FIG. 15 is a schematic signal timing diagram of the optical relay system according to Embodiment 4 of the present invention.

When a signal sequence of the input signal input to the first optical signal distribution device is A, corresponding signal sequences of output signals at positions C1, C11, C12, and C2 in FIG. 13 or 14 are as shown in FIG. 15.

The DQPSK signal includes 4 phases, the amplitude signal output by the first phase detection module includes 3 levels, which are a high level, a low level, and an intermediate level. The high or low level are respectively corresponding to one phase, the intermediate level are corresponding to two phases. The first phase detection module and the second phase detection module each detect two of the four phases, and amplitudes of the signals output by the first determination module, the second determination module, and the third determination module are different. The amplitude of the signal output by the first determination module needs to be inverted, the amplitude 0 is inverted to 1, the amplitude 1 is inverted to 0, and in this embodiment, the phase of the signal is modulated at a position of $\pi/4$.

The modulation behaviors of the first phase modulation module, the second phase modulation module, and the third phase modulation module are not overlapped on time, the three phase modulation modules may also be combined into a phase modulator. Here, the input amplitude modulated signals C1, C11, and C12 need to be adjusted, such that each path of signal may be modulated into the corresponding optical phase. The optical relay system is different from an existing DQPSK modulator that an input of the existing DQPSK modulator is two-dimensional information (2-bit data information), and an output is one-dimensional information (phase information), but the optical relay system of this embodiment directly obtains the phase information of the signal, and regenerates the phase information.

In this embodiment, the amplitude modulated signal is generated through the phase information extracted by the phase detection device, the phase information is loaded on the new phase base by the phase regeneration and load device by using the amplitude modulated signal, so as to generate the phase regenerated signal, thus eliminating the phase noise of the signal in the transmission process, improving a transmission performance of the signal, and realizing a simple implementation method.

Embodiment 5

An optical relay system is provided in this embodiment. Being similar to Embodiment 1, the optical relay system provided in this embodiment also includes a first optical signal distribution device, a phase detection device, an amplitude regeneration device, a second optical signal distribution device (optional), and a phase regeneration and load device. Functions of the devices are the same as those of Embodiment 1, so they are not repeated here. The optical relay system is adapted for an all-optical relay of a DQPSK signal. The system designs the phase detection device in a parallel mode, the phase detection device outputs two paths of an amplitude modulated signal, and the phase regeneration and load device modulates an amplitude regenerated signal by using the two paths of the amplitude modulated signal at the same time, such that the relay system is substantially a parallel system. In the serial solution given in Embodiment 4, the phase detection device extracts the phase information of the signal from the first path of the input signal, and converts the phase information to the amplitude signal, and the phase is loaded on the new phase base by using the amplitude signal. In the parallel solution given in this embodiment, the phase detection device extracts the phase information of the signal from a first path of an input signal, and restores the phase information to an original two-bit data signal, and the phase information is loaded on a phase base by using the two-bit data signal.

Figure 16:
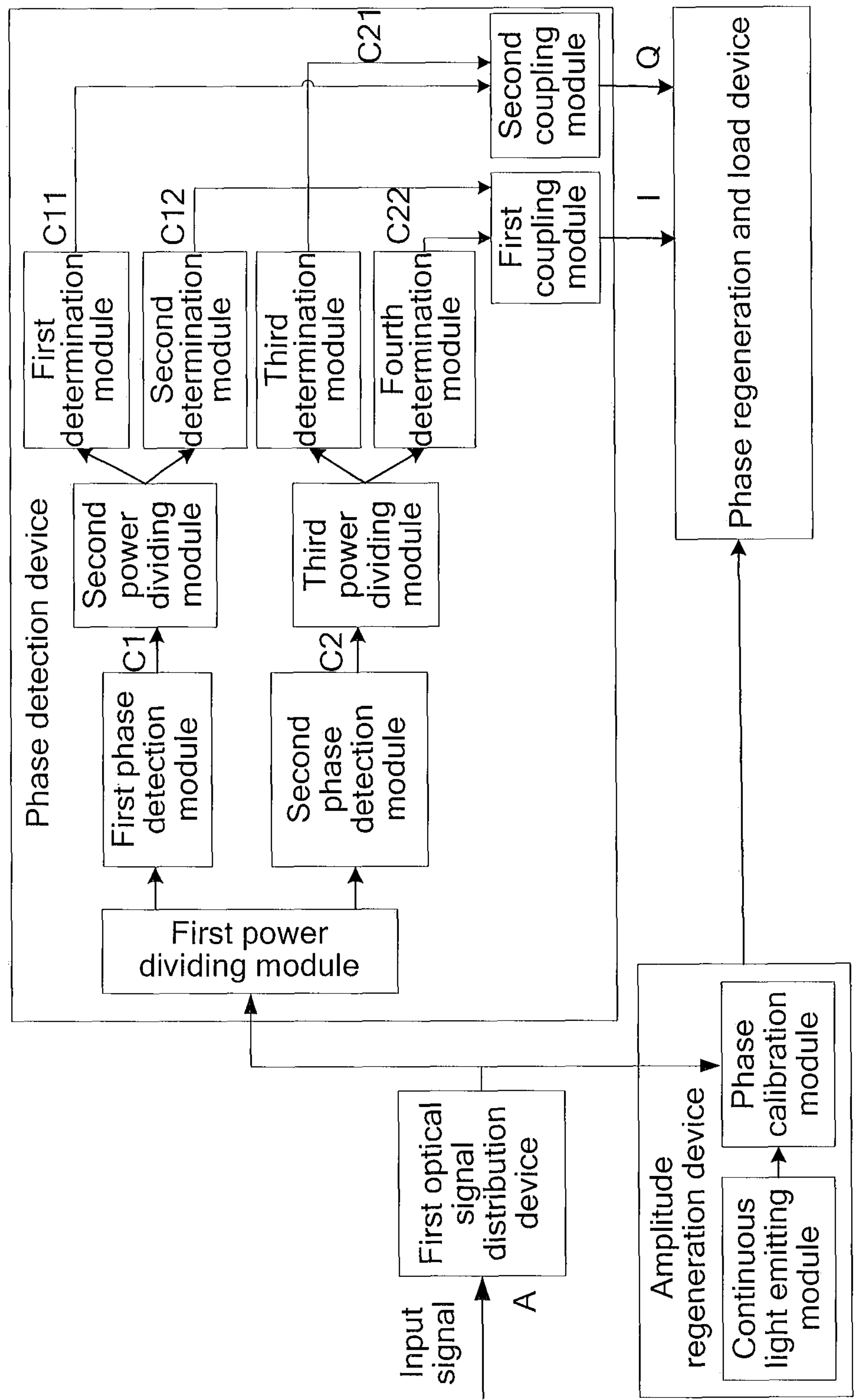
FIG. 16 is a detailed structural view of an optical relay system according to Embodiment 5 of the present invention.

Referring to FIG. 16, the phase detection device of the optical relay system provided in this embodiment particularly includes a first power dividing module, a first phase detection module, a second power dividing module, a first determination module, a second determination module, a second phase detection module, a third power dividing module, a third determination module, a fourth determination module, a first coupling module, and a second coupling module.

The first power dividing module is adapted to receive the first path of the input signal output by the first optical signal distribution device, divide the first path of the input signal into two paths, and output the two paths.

The first phase detection module is adapted to receive one path of signal of the first path of the input signal output by the first power dividing module, extract phase information of the path of the signal, convert the phase information to a first amplitude modulated signal, and output the first amplitude modulated signal, in which the first amplitude modulated signal is a data signal.

The second power dividing module is adapted to receive the first amplitude modulated signal output by the first phase detection module, divide the first amplitude modulated signal into two paths, and output the two paths.

The first determination module is adapted to receive one path of the first amplitude modulated signal output by the second power dividing module, determine whether an amplitude of the path of the first amplitude modulated signal is a first preset amplitude, and if an amplitude of the path of the first amplitude modulated signal is a first preset amplitude, output the path of the first amplitude modulated signal.

The second determination module is adapted to receive the other path of the first amplitude modulated signal output by the second power dividing module, determine whether an amplitude of the other path of the first amplitude modulated signal is a second preset amplitude, and if an amplitude of the other path of the first amplitude modulated signal is a second preset amplitude, output the other path of the first amplitude modulated signal.

The second phase detection module is adapted to receive the other path of signal of the first path of the input signal output by the power dividing module, extract phase information of the other path of the signal, convert the phase information to a second amplitude modulated signal, and output the second amplitude modulated signal, in which the first amplitude modulated signal is also a data signal.

The third power dividing module is adapted to receive the second amplitude modulated signal output by the second phase detection module, divide the second amplitude modulated signal into two paths, and output the two paths.

The third determination module is adapted to receive one path of the second amplitude modulated signal output by the third power dividing module, determine whether an amplitude of the path of the second amplitude modulated signal is a third preset amplitude, and if an amplitude of the path of the second amplitude modulated signal is a third preset amplitude, output the path of the second amplitude modulated signal.

The fourth determination module is adapted to receive the other path of the second amplitude modulated signal output by the third power dividing module, determine whether an amplitude of the other path of the second amplitude modulated signal is a fourth preset amplitude, and if an amplitude of the other path of the second amplitude modulated signal is a fourth preset amplitude, output the other path of the second amplitude modulated signal.

The first coupling module is adapted to receive the other path of the first amplitude modulated signal output by the second determination module and the other path of the second amplitude modulated signal output by the fourth determination module, couple the other path of the first amplitude modulated signal with the other path of the second amplitude modulated signal to obtain a first coupled amplitude modulated signal, and output the first coupled amplitude modulated signal to the phase regeneration and load device.

The second coupling module is adapted to receive the path of the first amplitude modulated signal output by the first determination module and the path of the second amplitude modulated signal output by the third determination module, couple the path of the first amplitude modulated signal with the path of the second amplitude modulated signal to obtain a second coupled amplitude modulated signal, and output the second coupled amplitude modulated signal to the phase regeneration and load device.

Correspondingly, the phase regeneration and load device is adapted to receive the first coupled amplitude modulated signal and the second coupled amplitude modulated signal output by the phase detection device, and the amplitude regenerated signal output by the amplitude regeneration device, and load the phase on the amplitude regenerated signal by using the first coupled amplitude modulated signal and the second coupled amplitude modulated signal, so as to generate the phase regenerated signal.

Figure 17:
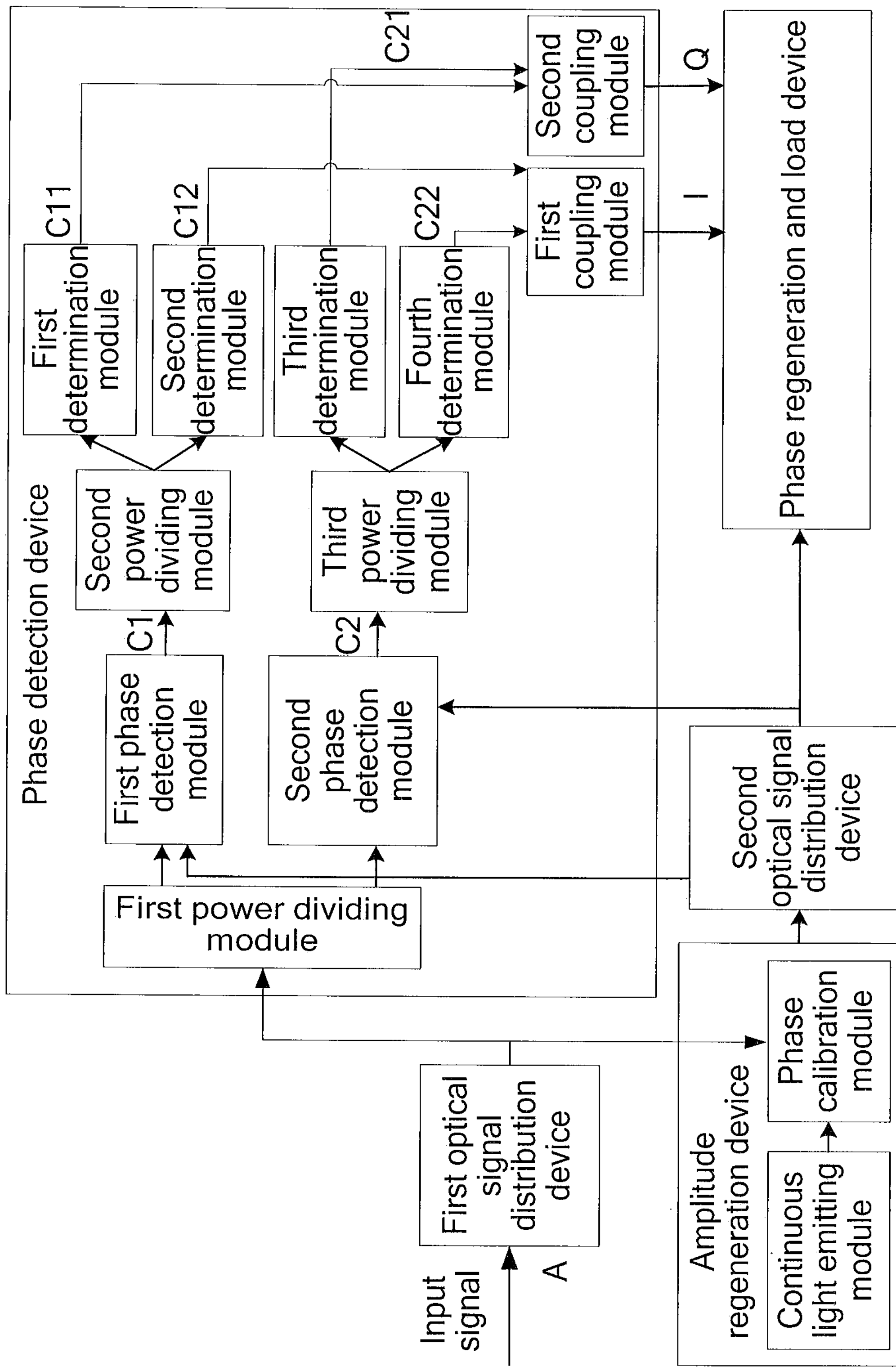
FIG. 17 is a detailed structural view of another optical relay system according to Embodiment 5 of the present invention.

Referring to FIG. 17, a second optical signal distribution device may also be placed in the optical relay system, and other devices are the same as those in FIG. 16, and are not described in detail here.

Figure 18:
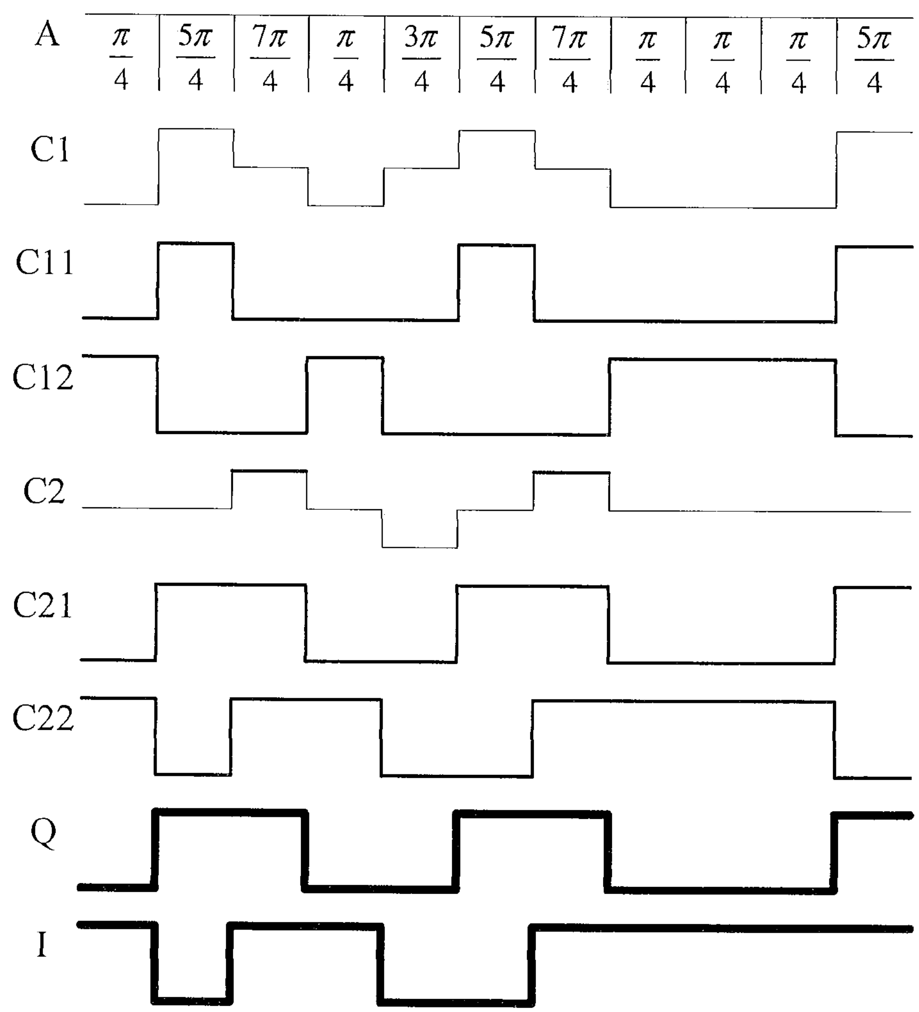
FIG. 18 is a schematic signal timing diagram of the optical relay system according to Embodiment 5 of the present invention.

When a signal sequence of the input signal input to the first optical signal distribution device is A, corresponding signal sequences of output signals at positions C1, C2, C11, C12, C21, C22, Q, and I in FIG. 16 or 17 are as shown in FIG. 18.

In this embodiment, the amplitude modulated signal (being the two-bit data signal) is generated through the phase information extracted by the phase detection device, the phase information is loaded on the new phase base by the phase regeneration and load device by using the amplitude modulated signal, so as to generate the phase regenerated signal, thus eliminating the phase noise of the signal in the transmission process, improving a transmission performance of the signal, and realizing a simple implementation method.

Embodiment 6

Figure 19:
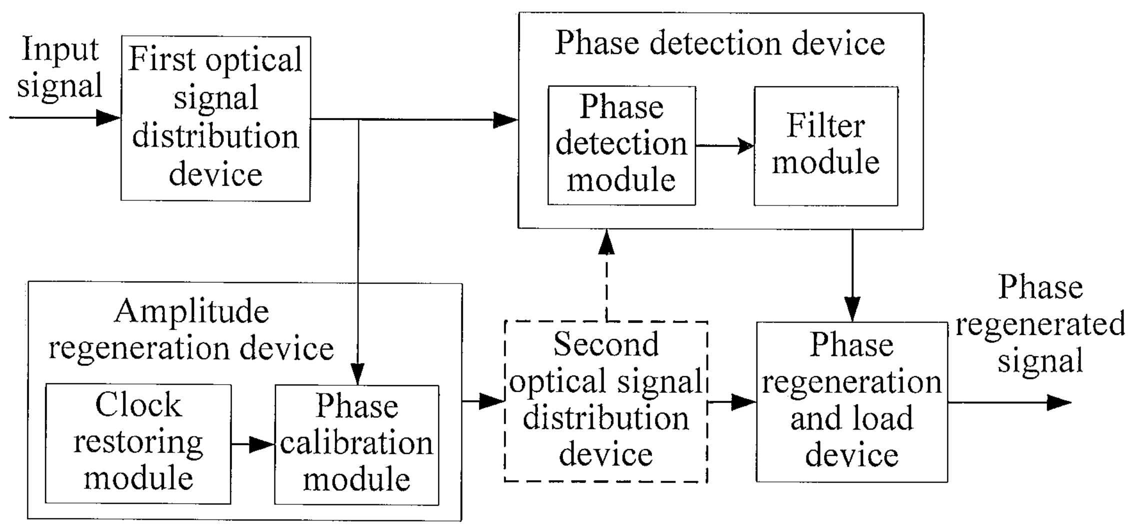
FIG. 19 is a detailed structural view of an optical relay system according to Embodiment 6 of the present invention.
Figure 20:
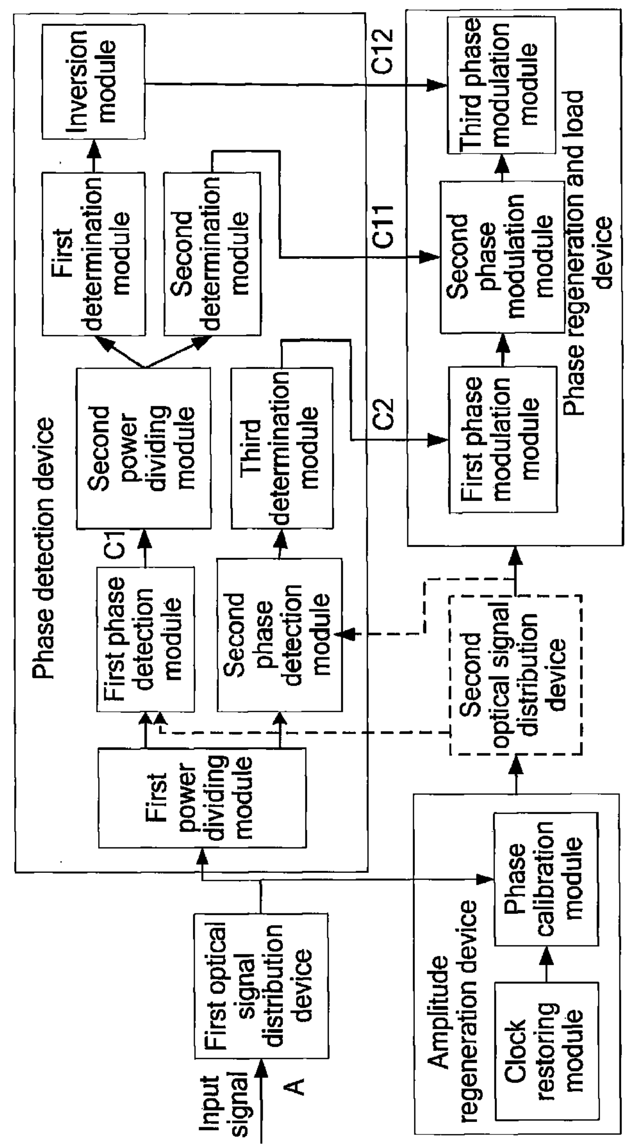
FIG. 20 is a detailed structural view of another optical relay system according to Embodiment 6 of the present invention.
Figure 21:
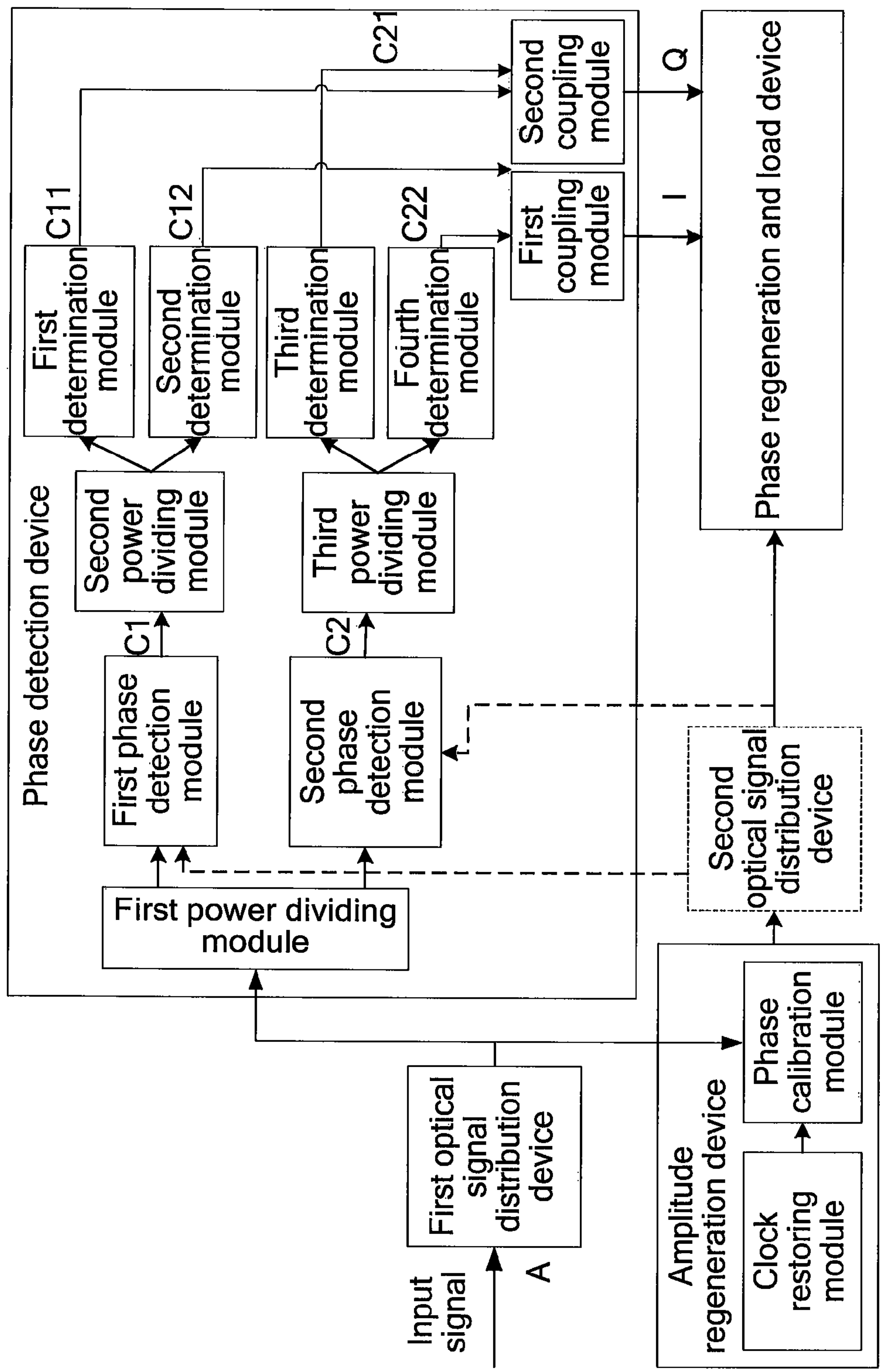
FIG. 21 is a schematic view of still another signal sequence of the optical relay system according to Embodiment 6 of the present invention.

An optical relay system is provided in this embodiment. The optical relay system is applicable to a return to zero-DPSK signal and an RZ-DQPSK signal. The optical relay system provided in this embodiment may be several combinations of the system provided in the embodiments, as shown in FIGS. 19, 20, and 21, the optical relay system provided in this embodiment is similar to that in Embodiment 3, Embodiment 4, and Embodiment 5, and a difference is that the amplitude regeneration device includes a clock restoring module and a phase calibration module.

The clock restoring module is adapted to receive a second path of an input signal output by a first optical signal distribution device, restore a clock signal of the second path of the input signal, and output the restored clock signal.

The phase calibration module is adapted to receive the second path of the input signal output by the first optical signal distribution device and the clock signal output by the clock restoring module, calibrate a phase of the clock signal according to the second path of the input signal to obtain the amplitude regenerated signal having a carrier synchronous with the second path of the input signal, and output the amplitude regenerated signal.

Particular implementation functions of the clock restoring module are the same as the clock restoring module in Embodiment 2, particular implementation functions of the phase calibration module are the same as the phase calibration module in Embodiment 33, so they are not described in detail. Particular implementation functions of other modules or devices are the same as that of the embodiments, so they are not described in detail.

The optical relay system provided in the embodiments may complete the relay of the ODB, the DPSK, the DQPSK, and other phase modulated signals, and may also be applicable to he RZ-ODB, the RZ-DPSK, the RZ-DQPSK, and other RZ type signals. In the RZ-DPSK and the RZ-DQPSK, the amplitude of the input signal needs to be regenerated, the regenerated signal instead of the continuous light serves as the phase base of the phase modulated signal, the phase information is loaded, and phase interferences during a transmission process are eliminated.

Embodiment 7

Figure 22:
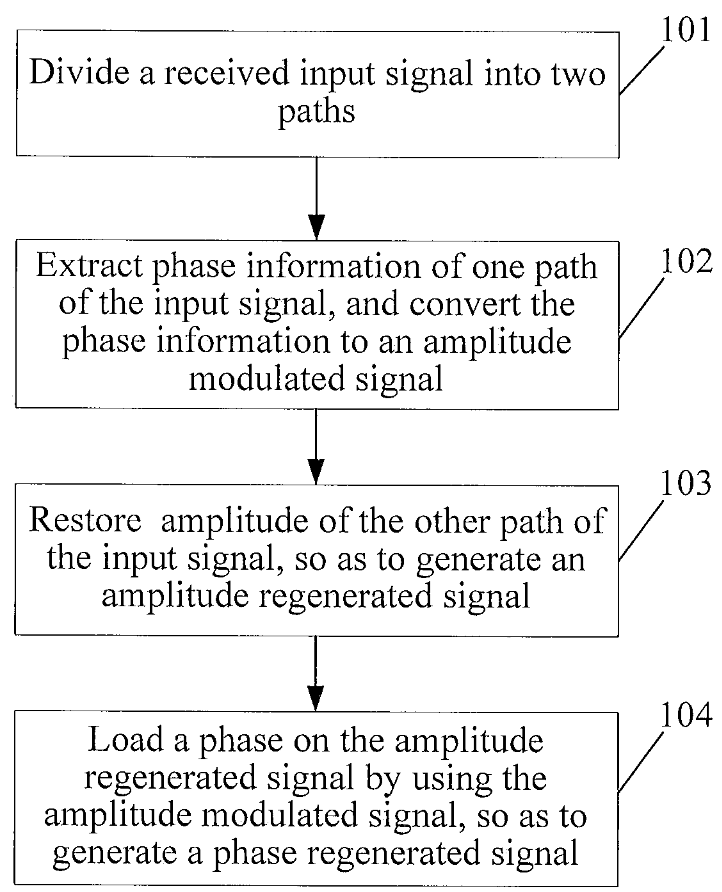
FIG. 22 is a flow chart of an optical relay method according to Embodiment 7 of the present invention.

Referring to FIG. 22, an optical relay method is provided in this embodiment, which includes the following steps.

In step 101, divide a received input signal into two paths.

In step 102, extract phase information of one path of the input signal, and convert the phase information to an amplitude modulated signal.

The amplitude modulated signal may be implemented through the two particular modes in the following.

1) The phase information is converted to intensity information, and the intensity information serves as the amplitude modulated signal.

2) The phase information is recovered to a two-bit data signal, the two-bit data signal serves as the amplitude modulated signal, such that the phase base is modulated concurrently.

After the amplitude modulated signal is obtained, in order to better load the phase, the amplitude modulated signal may be filtered, so as to filter out a clutter signal in the amplitude modulated signal, in which the clutter signal may be an interference signal generated in a transmission process.

In step 103, restore amplitude of the other path of the input signal, so as to generate an amplitude regenerated signal.

The amplitude of the other path of the input signal maybe restored in different modes according to different types of input signals, for example, for an ODB signal, the amplitude may be regenerated on a new wavelength position of the input signal, and then the amplitude is regenerated on the former wavelength position, that is, a waveform of the ODB signal is shaped; for a DPSK signal, a phase calibration is performed on a continuous light according to a carrier of the input signal, such that the phase of the continuous light is the same as the phase of the input signal; and for an RZ-DPSK signal and an RZ-DQPSK signal, the clock of the input signal may be directly restored.

In step 104, load a phase on the amplitude regenerated signal by using the amplitude modulated signal, so as to generate a phase regenerated signal.

A sequence of step 102 and step 103 may be exchanged without any strict limit.

In the method provided in this embodiment, the phase information of the input signal is extracted, the phase information is converted to the amplitude modulated signal, and the phase is loaded on the phase base by using the amplitude modulated signal, so the phase noise of the signal in the transmission process is eliminated, and a transmission performance is improved.

All or part of the content according to the embodiments of the present invention may be implemented by software programming, and the software program may be stored in a readable storage medium, for example, a hard disk, an optical disk, or a floppy disk in a computer.

The above descriptions are the embodiments of the present invention, but not intended to limit the present invention. Any modification, equivalent replacement, and improvement made without departing from the spirit and principle of the present invention fall within the scope of the present invention.

What is claimed is:

1. An optical relay system, comprising:

a first optical signal distribution device, adapted to receive an input signal, divide the input signal into a first path of the input signal and a second path of the input signal, and separately output the first path of the input signal and the second path of the input signal;

a phase detection device, adapted to receive the first path of the input signal output by the first optical signal distribution device, extract phase information of the first path of the input signal, convert the phase information to an amplitude modulated signal, and output the amplitude modulated signal;

an amplitude regeneration device, adapted to receive the second path of the input signal output by the first optical signal distribution device, shape the second path of the input signal to obtain an amplitude regenerated signal, and output the amplitude regenerated signal; and a phase regeneration and load device, adapted to receive the amplitude modulated signal output by the phase detection device and the amplitude regenerated signal output by the amplitude regeneration device, and load a phase on the amplitude regenerated signal by using the amplitude modulated signal to generate a phase regenerated signal; wherein the phase detection device comprises:

a phase detection module, adapted to receive the first path of the input signal output by the first optical signal distribution device, extract the phase information of the first path of the input signal, convert the phase information to the amplitude modulated signal, and output the amplitude modulated signal; and a filter module, adapted to receive the amplitude modulated signal output by the phase detection module, filter out a clutter signal in the amplitude modulated signal, output the amplitude modulated signal without the clutter signal to the phase regeneration and load device.

2. The optical relay system according to claim 1, wherein the phase regeneration and load device comprises:

an amplification module, adapted to receive the amplitude modulated signal output by the phase detection device, amplify the amplitude modulated signal, and output the amplified amplitude modulated signal;

a coupling module, adapted to receive the amplitude modulated signal output by the amplification module and the amplitude regenerated signal output by the amplitude regeneration device, couple the amplified amplitude modulated signal with the amplitude regenerated signal, and output a coupled signal;

a phase modulation module, adapted to receive the coupled signal output by the coupling module, load the phase information on the coupled signal to generate the phase regenerated signal, and output the phase regenerated signal; and a filter module, adapted to receive the phase regenerated signal output by the phase modulation module, and filter out a clutter signal in the phase regenerated signal, so as to obtain the phase regenerated signal without the clutter signal.

3. The optical relay system according to claim 1, wherein the amplitude regeneration device comprises:

a continuous light emitting module, adapted to provide a continuous light; and a phase calibration module, adapted to receive the second path of the input signal output by the first optical signal distribution device and the continuous light provided by the continuous light emitting module, calibrate a phase of the continuous light according to the second path of the input signal to obtain the amplitude regenerated signal, and output the amplitude regenerated signal.

4. The optical relay system according to claim 1, wherein the phase detection device comprises:

a first power dividing module, adapted to receive the first path of the input signal output by the first optical signal distribution device, divide the first path of the input signal into two paths, and output the two paths;

a first phase detection module, adapted to receive one path of the first path of the input signal output by the first power dividing module, extract phase information of the path of signal, convert the phase information to a first amplitude modulated signal, and output the first amplitude modulated signal;

a second power dividing module, adapted to receive the first amplitude modulated signal output by the first phase detection module, divide the first amplitude modulated signal into two paths, and output the two paths;

a first determination module, adapted to receive one path of the first amplitude modulated signal output by the second power dividing module, determine whether an amplitude of the path of the first amplitude modulated signal is a first preset amplitude, and if an amplitude of the path of the first amplitude modulated signal is a first preset amplitude, output the path of the first amplitude modulated signal;

an inversion module, adapted to invert the amplitude of the path of the first amplitude modulated signal output by the first determination module, and output the inverted first amplitude modulated signal to the phase regeneration and load device;

a second determination module, adapted to receive the other path of the first amplitude modulated signal output by the second power dividing module, determine whether an amplitude of the other path of the first amplitude modulated signal is a second preset amplitude, and if an amplitude of the other path of the first amplitude modulated signal is a second preset amplitude, output the other path of the first amplitude modulated signal to the phase regeneration and load device;

a second phase detection module, adapted to receive the other path of the first path of the input signal output by the power dividing module, extract phase information of the other path of signal, convert the phase information to a second amplitude modulated signal, and output the second amplitude modulated signal; and a third determination module, adapted to receive the second amplitude modulated signal output by the second phase detection module, determine whether an amplitude of the second amplitude modulated signal is a third preset amplitude, and if an amplitude of the second amplitude modulated signal is a third preset amplitude, output the second amplitude modulated signal to the phase regeneration and load device;

correspondingly, the phase regeneration and load device is adapted to receive the inverted first amplitude modulated signal, the other path of the first amplitude modulated signal, and the second amplitude modulated signal output by the phase detection device, and the amplitude regenerated signal output by the amplitude regeneration device, and load the phase on the amplitude regenerated signal by using the inverted first amplitude modulated signal, the other path of the amplitude modulated signal, and the second amplitude modulated signal, so as to generate the phase regenerated signal.

5. The optical relay system according to claim 4, wherein the phase regeneration and load device comprises:

a first phase modulation module, adapted to receive the second amplitude modulated signal output by the third determination module and the amplitude regenerated signal output by the amplitude regeneration device, load the phase on the amplitude regenerated signal by using the second amplitude modulated signal to obtain a first phase regenerated signal, and output the first phase regenerated signal;

a second phase modulation module, adapted to receive the first phase regenerated signal output by the first phase modulation module and the other path of the first amplitude modulated signal output by the second determination module, load a phase on the first phase regenerated signal by using the other path of the first amplitude modulated signal to obtain a second phase regenerated signal, and output the second phase regenerated signal; and a third phase modulation module, adapted to receive the second phase regenerated signal output by the second phase modulation module and the inverted first amplitude modulated signal output by the inversion module, and load a phase on the second phase regenerated signal by using the inverted first amplitude modulated signal, so as to generate the phase regenerated signal.

6. The optical relay system according to claim 1, wherein the phase detection device comprises:

a first power dividing module, adapted to receive the first path of the input signal output by the first optical signal distribution device, divide the first path of the input signal into two paths, and output the two paths;

a first phase detection module, adapted to receive one path of signal of the first path of the input signal output by the first power dividing module, extract phase information of the path of signal, convert the phase information to a first amplitude modulated signal, and output the first amplitude modulated signal;

a second power dividing module, adapted to receive the first amplitude modulated signal output by the first phase detection module, divide the first amplitude modulated signal into two paths, and output the two paths;

a first determination module, adapted to receive one path of the first amplitude modulated signal output by the second power dividing module, determine whether an amplitude of the path of the first amplitude modulated signal is a first preset amplitude, and if an amplitude of the path of the first amplitude modulated signal is a first preset amplitude, output the path of the first amplitude modulated signal;

a second determination module, adapted to receive the other path of the first amplitude modulated signal output by the second power dividing module, determine whether an amplitude of the other path of the first amplitude modulated signal is a second preset amplitude, and if an amplitude of the other path of the first amplitude modulated signal is a second preset amplitude, output the other path of the first amplitude modulated signal;

a second phase detection module, adapted to receive the other path of signal of the first path of the input signal output by the power dividing module, extract phase information of the other path of signal, convert the phase information to a second amplitude modulated signal, and output the second amplitude modulated signal;

a third power dividing module, adapted to receive the second amplitude modulated signal output by the second phase detection module, divide the second amplitude modulated signal into two paths, and output the two paths;

a third determination module, adapted to receive one path of the second amplitude modulated signal output by the third power dividing module, determine whether an amplitude of the path of the second amplitude modulated signal is a third preset amplitude, and if an amplitude of the path of the second amplitude modulated signal is a third preset amplitude, output the path of the second amplitude modulated signal;

a fourth determination module, adapted to receive the other path of the second amplitude modulated signal output by the third power dividing module, determine whether an amplitude of the other path of the second amplitude modulated signal is a fourth preset amplitude, and if an amplitude of the other path of the second amplitude modulated signal is a fourth preset amplitude, output the other path of the second amplitude modulated signal;

a first coupling module, adapted to receive the other path of the first amplitude modulated signal output by the second determination module and the other path of the second amplitude modulated signal output by the fourth determination module, couple the other path of the first amplitude modulated signal with the other path of the second amplitude modulated signal to obtain a first coupled amplitude modulated signal, and output the first coupled amplitude modulated signal to the phase regeneration and load device: and a second coupling module, adapted to receive the path of the first amplitude modulated signal output by the first determination module and the path of the second amplitude modulated signal output by the third determination module, couple the path of the first amplitude modulated signal with the path of the second amplitude modulated signal to obtain a second coupled amplitude modulated signal, and output the second coupled amplitude modulated signal to the phase regeneration and load device;

correspondingly, the phase regeneration and load device is adapted to receive the first coupled amplitude modulated signal and the second coupled amplitude modulated signal output by the phase detection device, and the amplitude regenerated signal output by the amplitude regeneration device, and load the phase on the amplitude regenerated signal by using the first coupled amplitude modulated signal and the second coupled amplitude modulated signal, so as to generate the phase regenerated signal.

7. The optical relay system according to claim 1, wherein the amplitude regeneration device comprises:

a clock restoring module, adapted to receive the second path of the input signal output by the first optical signal distribution device, restore a clock signal of the second path of the input signal, and output the restored clock signal; and a phase calibration module, adapted to receive the second path of the input signal output by the first optical signal distribution device and the clock signal output by the clock restoring module, calibrate a phase of the clock signal according to the second path of the input signal to obtain the amplitude regenerated signal having a carrier synchronous with the second path of the input signal, and output the amplitude regenerated signal.

8. An optical relay system, comprising:

a first optical signal distribution device, adapted to receive an input signal, divide the input signal into a first path of the input signal and a second path of the input signal, and separately output the first path of the input signal and the second path of the input signal;

a phase detection device, adapted to receive the first path of the input signal output by the first optical signal distribution device, extract phase information of the first path of the input signal, convert the phase information to an amplitude modulated signal, and output the amplitude modulated signal;

an amplitude regeneration device, adapted to receive the second path of the input signal output by the first optical signal distribution device, shape the second path of the input signal to obtain an amplitude regenerated signal, and output the amplitude regenerated signal; and a phase regeneration and load device, adapted to receive the amplitude modulated signal output by the phase detection device and the amplitude regenerated signal output by the amplitude regeneration device, and load a phase on the amplitude regenerated signal by using the amplitude modulated signal to generate a phase regenerated signal;

wherein a second optical signal distribution device is placed between the amplitude regeneration device and the phase regeneration and load device, and the second optical signal distribution device is adapted to divide the amplitude regenerated signal output by the amplitude regeneration device into two paths, output a first path of the amplitude regenerated signal to the phase detection device, and output a second path of the amplitude regenerated signal to the phase regeneration and load device;

correspondingly, the phase detection device is further adapted to receive the first path of the amplitude regenerated signal output by the amplitude regeneration device, and extract the phase information of the first path of the input signal according to the first path of the amplitude regenerated signal; wherein the phase detection device comprises:

a phase detection module, adapted to receive the first path of the input signal output by the first optical signal distribution device and the first path of the amplitude regenerated signal output by the second optical signal distribution device, extract the phase information of the first path of the input signal according to the first path of the amplitude regenerated signal, convert the phase information to the amplitude modulated signal, and output the amplitude modulated signal; and a filter module, adapted to receive the amplitude modulated signal output by the phase detection module, filter out a clutter signal in the amplitude modulated signal, and output the amplitude modulated signal without the clutter signal to the phase regeneration and load device.

9. The optical relay system according to claim 8, wherein the phase detection module comprises:

a calibration unit, adapted to receive the first path of the input signal output by the first optical signal distribution device and the first path of the amplitude regenerated signal output by the second optical signal distribution device, calibrate an amplitude, a wavelength, and a phase of the first path of the input signal according to the first path of the amplitude regenerated signal to generate a calibration signal having an amplitude, a frequency, and a phase that are the same as the first path of the amplitude regenerated signal, and output the calibration signal and the first path of the amplitude regenerated signal; and a coupling unit, adapted to receive the calibration signal and the first path of the amplitude regenerated signal output by the calibration unit, interfere with the calibration signal and the first path of the amplitude regenerated signal to generate the amplitude modulated signal, and output the amplitude modulated signal.

10. An optical relay method, comprising:

dividing a received input signal into two paths;

extracting phase information of one path of the input signal, and converting the phase information to an amplitude modulated signal;

restoring an amplitude of the other path of the input signal, so as to generate an amplitude regenerated signal; and loading a phase on the amplitude regenerated signal by using the amplitude modulated signal, so as to generate a phase regenerated signal; wherein the converting the phase information to the amplitude modulated signal comprises:

recovering the phase information to a two-bit data signal, and using the two-bit data signal as the amplitude modulated signal;

correspondingly, the loading the phase on the amplitude regenerated signal by using the amplitude modulated signal comprises:

loading the phase on the amplitude regenerated signal concurrently by using the two-bit data signal.

* * * * *